United States Patent [19]
Sandblom

[11] 3,782,192
[45] Jan. 1, 1974

[54] MEANS FOR DETERMINING A MAGNITUDE CORRESPONDING TO THE THICKNESS PROFILE OF A PAPER WEB

[75] Inventor: Henry Sandblom, Vasteras, Sweden

[73] Assignee: Allmanna Svenska Elektriska Aktiebolaget, Vasteras, Sweden

[22] Filed: Feb. 23, 1972

[21] Appl. No.: 228,707

[30] Foreign Application Priority Data
Feb. 25, 1971 Sweden..........................2383/71

[52] U.S. Cl. .................................. 73/159, 73/355 R
[51] Int. Cl. .......................................... G01m 25/56
[58] Field of Search.................. 73/159, 355 R, 351, 73/344

[56] References Cited
UNITED STATES PATENTS
3,535,630 10/1970 McMullen............................ 73/344
3,332,279 7/1967 Tompos................................ 73/159

Primary Examiner—Richard C. Queisser
Assistant Examiner—Denis E. Corr
Attorney—Jennings Bailey, Jr.

[57] ABSTRACT

In order to determine the thickness of a web of paper which is being wound on rolls, the temperature profile in the web is measured transversely as the web is rolled up to indicate the thickness. A second temperature profile is also measured at a point located ahead of the roll and a moisture profile is also registered ahead of the roll. Some of these signals or their combinations are used to control the mechanism.

9 Claims, 2 Drawing Figures

MEANS FOR DETERMINING A MAGNITUDE CORRESPONDING TO THE THICKNESS PROFILE OF A PAPER WEB

BACKGROUND OF THE INVENTION

1. Field of the Invention

The present invention relates to a means for determining a magnitude corresponding to the thickness profile of a web of paper while the paper is being wound on to members intended therefor.

2. The Prior Art

It is extremely valuable to obtain continuous information as to the thickness and thickness profile across and along a web of paper while the paper is being manufactured so that adjustments can be made immediately if there is any indication of an error.

Usually an exact indication of the thickness is not of importance. impartance. It is normally sufficient to know the thickness profile in relative measurements and a uniform profile is therefore aimed at.

Previously known means for determing the thickness profile of a web of paper are based on magnetic measurements, the web of paper passing through an air gap between two magnetic poles. The greatest drawback with such equipment is that the two magnetic poles must be pressed against and upper and lower side of the web.

The object of the present invention is to effect a device which enables measurements to be performed without the measuring devices coming into contact with the paper, thus eliminating all the drawbacks connected with previous equipment.

SUMMARY OF THE INVENTION

The invention is characterised by measuring a first temperature profile in the web in its transverse direction as it is wound on a winding roll; measuring a second temperature profile at a point located ahead of the winding roll; and measuring a moisture profile at a point located ahead of the winding roll; and utilizing the temperature profile on the roll, in some instances combined with one or both of the other profiles, to control the mechanism so as to obtain a more nearly constant thickness of the web.

The invention is based on the fact that successive turns of paper being rolled on to a reel, for example, will be packed harder and more tightly in those stretches where the paper is thicker, and correspondingly less hard and less tightly in those stretches where the paper is thinner. In the parts which are packed more tightly a different coefficient of thermal conductivity is obtained from that in less tightly packed parts. Consequently, a varying temperature profile is obtained along, for example, a reel in which the thickness profile alters.

BRIEF DESCRIPTION OF THE DRAWINGS

The invention will be further described with reference to the accompanying drawings in which.

DESCRIPTION OF THE PREFERRED EMBODIMENTS

Figure 1:
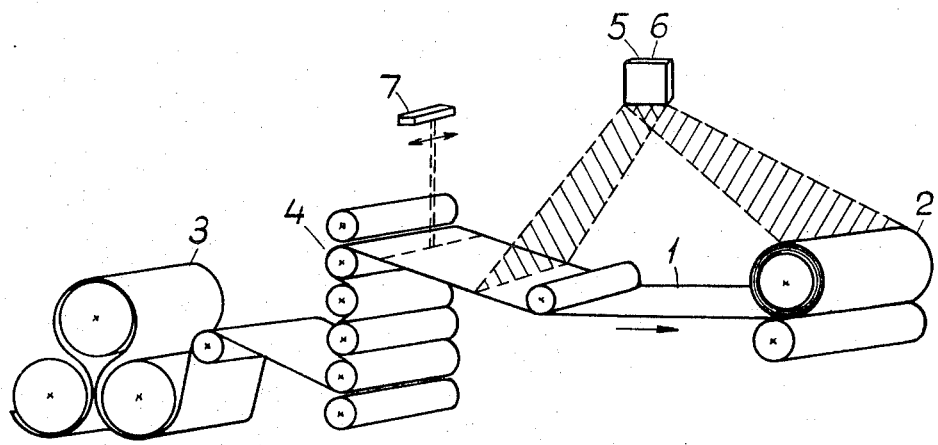
FIG. 1 shows a means according to the invention applied to a paper web and FIG. 2 shows equipment for calculating the thickness profile of the paper web, which forms a part of the device according to the invention.

FIG. 1 shows part of the final stage in a paper mill, roll 2, calender 4 and drying area 3, through which a paper web 1 runs to be finally rolled up on the reel 2. A member 5, which may consist of known thermoprofile equipment with IR-scan (for example AGA Thermoprofile Model THP-1) measures and registers a temperature profile C while the paper web 1 is being rolled on to the roll 2. This measurement can be taken by means of a scan across the reel 2 with high scan speed. Primarily because of the uneven heating of the paper web 1 in the drying section 3 and calender 4, corrections are necessary in the temperature profile C measured. These corrections comprise recording a temperature profile B and moisture profile A for the paper web in an earlier section of the paper track, ahead of the reel 2. The temperature profile B can be measured by a member 6, similar to the member 5, or both these members 5 and 6 may consist of one and the same member, which is indicated in FIG. 1. The moisture profile A, which is suitably recorded in the vicinity of or at the same point on the paper web 1 as the temperature profile B, is measured and registered most easily with the help of a travelling moisture gauge 7. Common for all these profile measurements A, B and C is that they are carried out without the instruments coming into contact with the paper web 1.

Figure 2:
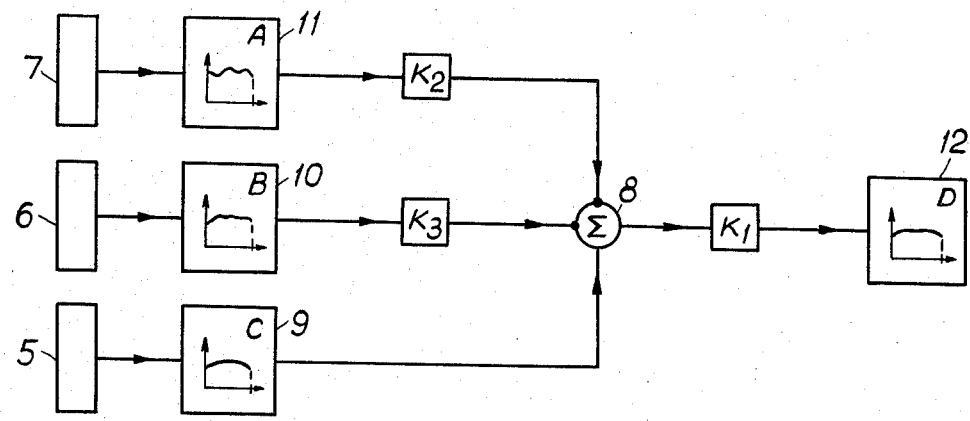

The profiles A, B and C recorded are connected to a difference producer 8 as shown in FIG. 2. The profiles A and B are multiplied by suitable calibrating functions $K_2$ and $K_3$, respectively so that they can be related to the profile C. The following difference is produced in the difference producer 8:

$$C - K_3 \cdot B - K_2 \cdot A$$

the calculation being performed point by point along the profile C. The information received by the difference producer, i.e. C, $K_3 \cdot B$ and $K_2 \cdot A$, may possibly be retained there for a certain period so that they can be studied. The difference producer 8 should in this case be provided with a viewing screen or the like.

The output signal from the difference producer 8 is multiplied by a calibration function $K_1$ so that it can be related to the dimension thickness. This signal, $$D = K_1 (C - K_3B - K_2A)$$

the thickness profile, may then suitably be connected to an oscilloscope, viewing screen, TV screen, X-Y recorder or the like.

It is also advisable to introduce alarm functions for thickness deviations. The related calibration functions $K_1$, $K_2$ and $K_3$ are suitably realised by means of adjustable potentiometers.

I claim:

1. Means for determining a magnitude corresponding to the thickness of a web of paper while the paper is being wound on to members intended therefor, which includes a first means (5) for measuring a first temperature profile (C) in the paper web (1) in its transverse direction on the winding member (2), and a first indicating device (9) connected to said first measuring means, the output signal of which indicates said thickness profile.

2. Means according to claim 1, characterised in that the means comprises a second means (6) for measuring a second temperature profile (B) of the paper web (1) in its transverse direction at a first point on the web located ahead of the winding member (2), and a third means (7) for measuring a moisture profile (A) of the paper web (1) in its transverse direction at a second point on the web located ahead of the winding member (2), and second and third indicating devices (10 and 11, respectively), and means for correcting the output signal from said first indicating device (9) in response to said second and third measuring means depending on the condition of the paper web (1).

3. Means according to claim 2, in which said first and second measuring means (5 and 6, respectively) comprise the same member.

4. Means according to claim 2, in which said first and second points on the paper web (1) coincide.

5. Means according to claim 4, which includes means for recording said moisture profile (A) and said second temperature profile (B) during the same measurement.

6. Means according to claim 2, including a difference producer (8) to which the output signals from said first, second and third indicating devices (9,10,11 respectively) are connected.

7. Means according to claim 6, including a fourth registering and/or indicating device (12), to which the output signal from said difference producer (8) is connected.

8. Means according to claim 7, including means to multiply each of the output signals from said second and third indicating devices (10,11, respectively) by a calibrating function ($K_3$, $K_2$, respectively) and means to multiply the output signal from said difference producer (8) by a calibrating function ($K_1$).

9. Means according to claim 6, characterised in that said difference producer (8) includes means to retain and memorize information received.

* * * * *